United States Patent

Weisenburger et al.

[11] 4,402,724
[45] Sep. 6, 1983

[54] METHOD AND APPARATUS FOR DISCHARGING GLASS FROM A MELTING FURNACE

[75] Inventors: Siegfried Weisenburger, Au; Hartmut Seiffert, Karlsruhe; Fred Holl, Schwetzingen, all of Fed. Rep. of Germany

[73] Assignee: Kernforschungszentrum Karlsruhe GmbH, Karlsruhe, Fed. Rep. of Germany

[21] Appl. No.: 79,881

[22] Filed: Sep. 27, 1979

[30] Foreign Application Priority Data

Sep. 29, 1978 [DE] Fed. Rep. of Germany ....... 2842505

[51] Int. Cl.³ ........................ C03B 5/26; C03B 7/08
[52] U.S. Cl. .......................................... 65/128; 65/70; 65/75; 65/324; 65/326
[58] Field of Search .................... 65/70, 75, 122, 123, 65/207, 223, 324, 326, 330, 331, 332, 327, 128

[56] References Cited

U.S. PATENT DOCUMENTS

| | | | |
|---|---|---|---|
| 1,680,543 | 8/1928 | Howard | 65/327 X |
| 1,853,842 | 4/1932 | Bates et al. | 65/327 UX |
| 2,186,718 | 1/1940 | Ferguson | 65/327 X |
| 3,078,695 | 2/1963 | Kozak et al. | 65/327 X |

*Primary Examiner*—Arthur D. Kellogg

*Attorney, Agent, or Firm*—Spencer & Kaye

[57] ABSTRACT

A method and apparatus for periodically discharging batches of a glass melt from a ceramic glass melting furnace in which localized heating energy limitable in time is supplied to the glass melt by means of electrodes in the furnace, the furnace being provided at its bottom with an induction heatable outlet member of ceramic material presenting a vertically oriented outlet passage for discharge of such batches, the furnace being operated to cause the outlet passage to be closed by a plug of the glass when no discharge is to take place, in which such plug is melted for discharging a batch of the glass melt via the outlet passage by preheating the outlet member and the glass plug by induction heating up to a preheating temperature which is below the melting temperature of the glass and above which the rate of increase of the electrical conductivity of the glass plug as a function of increasing temperature is greater than that of the ceramic material of the outlet member, and then further heating the plug, while retaining the induction heating power by means of resistance heating in which only the glass plug and the melt in the furnace serve as resistances, until the plug becomes almost liquid and molten and is suddenly pushed out of the outlet passage by the hydrostatic pressure of the glass melt thereabove.

8 Claims, 2 Drawing Figures

METHOD AND APPARATUS FOR DISCHARGING GLASS FROM A MELTING FURNACE

BACKGROUND OF THE INVENTION

The present invention relates to a method as defined in the preamble of claim 1.

German Auslegeschrift [Published Patent Application] No. 2,033,074 discloses a method for melting fission products into a glass mass, in which a quantity of the molten glass is periodically extracted from the bottom of a ceramic glass melting furnace by temporarily melting a plug of the glass mass which seals a discharge nozzle provided at the bottom of the glass melting furnace by means of induction heating. This discharge nozzle includes a metallic pipe and is inserted into the bottom of the ceramic glass melting furnace. It may be heated by means of an induction heater which is also inserted into the bottom of the furnace. Although the termination of the discharge of a glass melt charge is now described in this publication, this is probably effected by switching off the heater at the outlet and, as a result, slowly cooling the ceramic material surrounding the outlet.

This method has the following drawbacks:

1. During melting of the glass plug in the outlet, not only the discharge nozzle but also the ceramic material surrounding it is heated to almost the melting temperature of the glass plug;

2. Termination of the extraction of a charge requires a relatively long period of time after the heater is switched off until a sealing plug is again formed in the discharge nozzle by cooling of the subsequently discharged glass melt; and 3. Formation of a glass tongue, or a glass thread, at the end of the discharge nozzle cannot be avoided.

German Offenlegungsschrift [Laid-open Application] No. 2,426,328 discloses a tank furnace for continuously melting glasses, ceramic frits, minerals, glazings and enamels in which the molten glass is intended to be discharged in a simple manner. The outlet from this tank is oriented vertically downwardly and is disposed at the lowest point of the tank. A tubular electrode is disposed in the opening of the ceramic outlet block and the glass flows through a bore in the electrode. The electrode is placed onto an annular channel through which cooling water flows and which serves the purpose of cooling the entire lower face of the outlet block. This publication mentions that the outlet block constitutes the weakest part of the furnace since the entire discharge is effected through a relatively small bore. It is therefore necessary, the publication states, to protect the outlet against excessive corrosion by producing extensive cooling. Overly intensive cooling of the melt or the ingress of undesirable air into the exiting melt is prevented by a ceramic pipe which is connected at the bottom of the cooling channel. The melt itself is heated by further electrodes inside the tank. Intermittent discharging of the melt is not mentioned in this publication and is probably not intended, because it is pointed out that with this tank the desired discharge can be kept constant so that too rapid an emptying or too slow a discharge can be avoided. It is asserted as an advantage that the available melt can be discharged at a controlled rate.

SUMMARY OF THE INVENTION

It is a basic object of the present invention to eliminate major drawbacks of prior art molten glass charge dispensing procedures.

A further object of the present invention is to intermittently discharge a glass melt from a ceramic glass melting furnace which effects electrode heating of the glass melt and is provided with a vertical outlet disposed at the underside of the furnace, in such a manner that partial quantities of any desired amount of the glass melt can be dicharged rapidly and to considerably shorten the time during which discharge occurs after the heater is switched off.

A further object of the invention is to treat the outlet block as gently as possible by maintaining the temperature as low as possible. It is a further object of the invention to provide an apparatus for practicing the method.

The solution provided by the present invention is characterized in that the glass plug which seals the outlet of the melting furnace between discharges is melted by the following process steps:

(a) preheating the outlet containing the glass plug by induction heating alone or by induction heating and additional heating up to a temperature lying below the melting temperature and above which the electrical conductivity of the glass plug increases as a function of temperature more rapidly than does the electrical conductivity of the ceramic material of the outlet; and (b) further heating, while continuing to supply the power to the induction heater, by resistance heating, such that only the glass plug and the melt act as resistances, until the almost liquid molten glass plug is suddenly pushed out of the outlet by the hydrostatic pressure of the glass melt disposed thereabove.

In further accordance with the invention the flow of the glass melt is stopped by switching off at least the resistance heater and letting a glass plug solidify in the ceramic outlet to seal the outlet and subsequently briefly switching back on the induction heater so that the glass tongue, or thread, created below the ceramic outlet during solidification is melted away.

The objects of the invention are further achieved by the provision of an apparatus which includes an interchangeable, metallic short pipe provided with heating means and disposed below the outlet block located at the bottom of a ceramic glass melting furnace heated by electrodes. This short pipe has a compression flange at its upper end and the diameter of the inner wall of the pipe is smaller than the opening in the outlet block, the compression flange being constructed as an electrode.

According to an advantageous embodiment of this apparatus, the compression flange, the short pipe and the heating means are releasably fastened to fastening bricks at the underside of the furnace.

According to a further embodiment of the invention, the apparatus is provided with a short pipe having at least two longitudinal bores in its walls which are angled inwardly in the lower portion of the short pipe and open into the interior of the pipe.

Compared to the prior art methods for intermittent discharge of a glass melt, the present invention has several significant advantages. For example, the invention permits a relatively high fill accuracy to be realized due to the considerable shortening of the period of time between disconnection of the heater and blocking of the outlet by the glass plug which solidifies in the outlet. For example, in the case of a glass melt charge of about 70 kg, which requires a discharge period of about 30 to 40 minutes, the discharge can be stopped completely within 2 to 3 minutes after disconnecting the resistance heater. This means that the quantity of the glass melt collected in a receiving vessel can be metered much more accurately than in the prior art methods. In the process according to the invention, it is thus possible to achieve a fill accuracy of less than ±1 kg. This is of particular importance when highly radioactive wastes from a reprocessing plant for irradiated nuclear fuels are to be solidified and the waste radionuclides are melted into a glass matrix whereupon the glass melt is filled into a metallic mold intended for permanent storage, which mold must not be filled too high.

A further advantage of the method according to the invention is that the ceramic outlet block at the bottom of the glass melting furnace is treated as gently as possible. If, for example, a borosilicate glass melt is discharged at a temperature of about 1200° C. and the discharge time is about 40 minutes, the temperature of the outlet block may be several hundred degrees lower than that of the melt. This substantially prevents or at least greatly reduces corrosion of the surface of the outlet block which comes into contact with the glass melt. This means increased service life of the outlet block, better utilization of the glass melting furnace and safe operation. Moreover, by retaining the power from the induction heater, the otherwise required amounts of energy are reduced.

The present invention will be explained in connection with the drawings showing embodiments of the apparatus of the invention which are given merely as examples.

DESCRIPTION OF THE PREFERRED EMBODIMENTS

Figure 1:
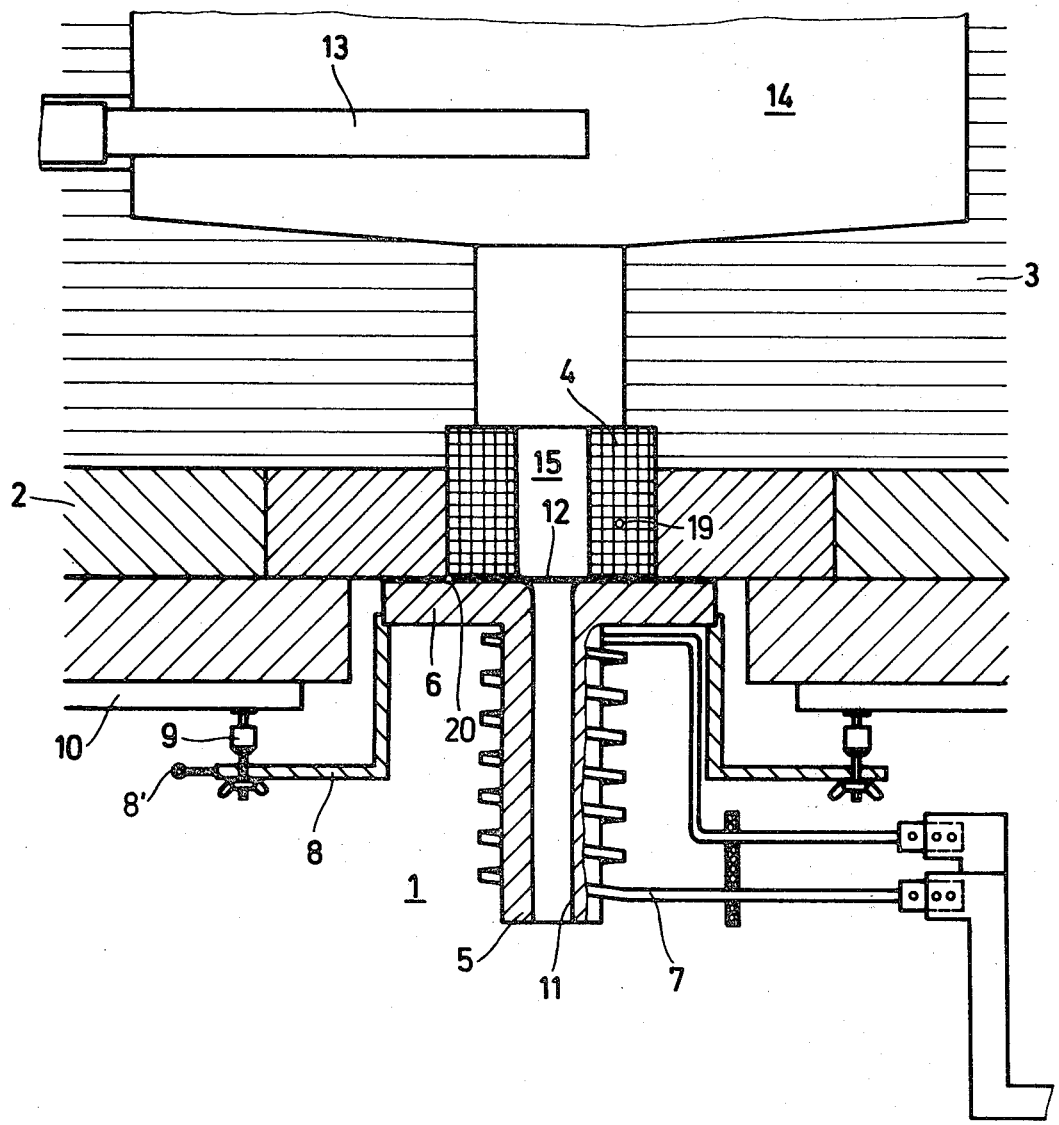
FIG. 1 is a schematic, elevational, cross-sectional view of a preferred embodiment of the apparatus according to the invention for practicing the method of the invention, together with that part of a known ceramic glass melting furnace which surrounds its outlet.

The apparatus 1, according to the invention shown in FIG. 1, is disposed below an outlet stone, or block, 4 disposed at the bottom 2 of a conventional ceramic glass melting furnace 3. The apparatus, which is made of a suitable stainless steel such as, for example, Inconel 600 or Inconel 690, essentially includes a short pipe 5 with a compression flange 6 attached to its upper end, and a heater 7 wound around the short pipe 5. The apparatus is fastened to fastening bricks 10 disposed at the underside of the glass melting furnace 3 by means of angle irons 8 and screw fasteners 9.

While the glass melt 14 is being kept molten and homogenized in the furnace 3, which is heated by electrodes 13, a glass plug 15 sealing the outlet still remains solid in the opening 12 of the outlet block 4. In order to extract a charge of glass melt from the furnace 3, the apparatus 1 is heated, according to the method of the present invention, and thus the outlet block 4 and the glass plug 15 are heated as well.

The heating is first effected until there is attained a preheating temperature above which the electrical conductivity of the glass plug 15 increases more steeply with increasing temperature than does the electric conductivity of the outlet block 4. For discharging, for example, a borosilicate glass melt, this preheating temperature lies at about 500° C. Then, not later than the moment at which this preheating temperature is reached, the compression flange 6, constructed as an electrode, is placed, via lead 8', at a potential different from that of the electrode 13 in the melt and thus a resistance heater, in which the glass plug 15 and the glass melt 14 provide the resistance, is put into operation. In this connection it is important that the diameter of the inner wall 11 of the short pipe 5 be smaller than the opening 12 in the outlet block 4 so that the compression flange 6 can remain in contact with the glass plug 15.

In order to monitor the temperature thermocouples 19 and 20 as temperature sensors are located in block 4, and between the compression flange 6 and the outer edge of block 4 respectively.

While the supply of heating power to the induction heater 7 is maintained and thus the temperature of the outlet block 4 increases but slowly, the glass plug 15 is brought to about 1200° C. within a heating period of 3 to 4 minutes and is heated until it is suddenly pushed out of the outlet by the hydrostatic pressure of the glass melt thereabove.

After the desired quantity of glass melt 14 has been discharged, at least the resistance heater is switched off, whereupon a new glass plug can form again within 2 to 3 minutes in the opening 12 of the outlet block 4. If a glass tongue or glass thread, respectively, should form inside the short pipe 5 during cooling, which is likely to occur in particular when heater 7 has also been switched off, the induction heater 7 is switched on again for a short time to melt away the glass tongue or thread.

It has been found to be advantageous to dimension the short pipe 5 so that the ratio of its length to its inner diameter is about 25:1. If this ratio is to be reduced, for example, to provide a larger inner diameter of the short pipe, in order to obtain a higher throughput, a gas cooling system (not shown in the drawing) can be inserted between the heater 7 and the short pipe 5.

Figure 2:
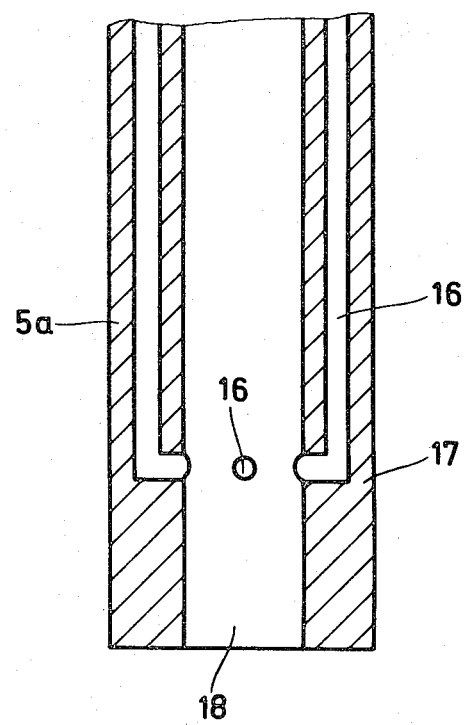
FIG. 2 is a schematic, cross-sectional, detail view of the lower part of a modified short pipe for the apparatus according to the invention, with the induction heater removed for clarity.

If the short pipe 5 is to have a larger outlet cross section, the form of construction shown in FIG. 2 is more advantageous. The short pipe 5a shown in FIG. 2 has at least two longitudinal bores 16 in its walls which bores are angled inwardly in the lower portion 17 of the pipe and open into the interior 18 of the pipe. A cooling gas, for example, air or nitrogen, is forced through the longitudinal bores 16 and, due to the resulting pressure buildup and cooling of the melt, the gas causes the glass to solidify at this location in the short pipe 5a. This permits the formation of a solidified glass plug 15 in the outlet block 4 even if the short pipe 5a has a larger outlet cross section.

When the outer portion of the plug 15 is molten (at about 1150° C.) the glass plug is pushed out by hydrostatic pressure of the melt 14 through the short pipe 5.

Pipe 5 the outlet channel is made of Inconel 690 and 16 mm in inner dia. For start of the glass flow the Inconel tube is mean frequency heated. The glass flow rate is now 240 kg/h.

The temperature for the first heating step is about 500° C., for the second step is about 1150° C. to 1200° C. The first step was reached in 1 h, the second step in about 3 days. The draining system on the bottom of the melting cavity consists of a 280 mm long outlet channel of ceramic. The electrical energy during each heating step is about 5-6 KW.

It is to be understood that the above description of the present invention is susceptible to various modifications, changes and adaptations, and the same are intended to be comprehended within the meaning and range of equivalents of the appended claims.

What is claimed is:

1. In a method for periodically discharging batches of a glass melt from a ceramic glass melting furnace in which localized heating energy limitable in time is supplied to the glass melt by means of electrodes in the furnace, the furnace being provided at its bottom with an induction heatable outlet member of ceramic material presenting a vertically oriented outlet passage for discharge of such batches, means defining a resistance heating region extending between the furnace electrodes and the bottom of the outlet member, and an induction heating source generating induction heat in a region located below the outlet member and below the resistance heating region, the furnace being operated to cause the outlet passage to be closed by a plug of the glass when no discharge is to take place, the improvement comprising melting such plug for discharging a batch of the glass melt via the outlet passage by the steps of:
   (a) preheating the outlet member and the glass plug by induction heating produced by said source up to a preheating temperature which is below the melting temperature of the glass and above which the rate of increase of the electrical conductivity of the glass plug as a function of increasing temperature is greater than that of the ceramic material of the outlet member; and
   (b) then further, heating the plug, while retaining the induction heating power, by means of resistance heating in said resistance heating region in which only the glass plug and the melt in the furnace serve as resistances, until the plug becomes almost liquid and molten and is suddenly pushed out of the outlet passage by the hydrostatic pressure of the glass melt thereabove.

2. A method as defined in claim 1 wherein said step of preheating is carried out by generating heat by a means in addition to the induction heating.

3. A method as defined in claim 1 or 2 further comprising: terminating the flow of a glass melt batch by switching off the resistance heating and allowing a new glass plug to solidify in the outlet passage to block the outlet passage; and subsequently effecting a brief induction heating so as to melt away any glass tongue formed underneath the outlet passage during the solidification of the new plug.

4. A method as defined in claim 3 wherein said step of terminating further includes switching off the induction heating.

5. Apparatus for periodically discharging batches of a glass melt from a ceramic glass melting furnace in which localized heating energy limitable in time is supplied to the glass melt by means of electrodes in the furnace, the furnace being provided at its bottom with an induction heatable outlet member of ceramic material presenting a vertically oriented outlet passage for discharge of such batches, and the furnace being operated to cause the outlet passage to be closed by a plug of the glass when no discharge is to take place, said apparatus comprising: a replaceable, metallic short length of pipe provided at its upper end with a compression flange constructed to constitute an electrode, said pipe being disposed beneath said outlet member to present a vertical discharge passage aligned with said outlet passage and having a diameter smaller than that of said outlet passage; electrical current supply means connected to said electrode constituted by said flange to define a resistance heating path the lowermost point of which is said electrode constituted by said flange and which extends upwardly therefrom through glass in said outlet passage and in said furnace; and heating means disposed below said resistance heating path in heat transfer relationship with said pipe for heating said pipe and, in turn, said outlet member.

6. An arrangement as defined in claim 5 wherein said furnace is provided at its underside with fastening bricks, said compression flange is removably fastened to said bricks, and said heating means are mounted on said pipe.

7. Apparatus as defined in claim 5 wherein said short pipe is provided with at least two longitudinal bores formed in the walls of said pipe, said bores being angled inwardly in the lower portion of said pipe and opening into the discharge passage presented by said short pipe.

8. Apparatus as defined in claim 6 wherein said heating means are induction heating means.

* * * * *